Patented Apr. 11, 1950

2,503,853

UNITED STATES PATENT OFFICE 2,503,853

METHOD OF EXTRACTING VITAMIN A FROM COW LIVERS

Willem Stevens, Weesp, Netherlands, assignor, by mesne assignments, to Hartford National Bank and Trust Company, Hartford, Conn., as trustee No Drawing. Application February 19, 1946, Serial No. 648,825. In the Netherlands April 23, 1942

Section 1, Public Law 690, August 8, 1946
Patent expires April 23, 1962

3 Claims. (Cl. 167—81)

The invention relates to the extraction of lipoids from hydrous materials of natural origin which contain these constituents combined with albumens. To that end a number of steps which precede the extraction with the aid of a fat solvent are generally taken, the most important being disintegration and drying.

During this drying operation, which is accompanied by heating, there occurs denaturation of the albumen, owing to which the extraction is made possible.

For denaturating the albumen prior to the extraction of the lipoid it is also possible to utilize re-agents liable to denaturate albumen, for example calcium chloride, magnesium chloride, lead acetate or invert soap.

With the use of extracting agents such as ethanol and acetone, which are completely mixable with water, there also occurs denaturation of the albumen, such in contradistinction to fat solvents such as petroleum ether, petrol, benzene, chlorated hydrocarbons and the like, which are insoluble or poorly soluble in water.

The invention is connected with the last-mentioned method since it likewise has for its object to suppress the preceding steps of heating and drying which are usual in the industrial extraction technique and, besides, to avoid the drawback that a large quantity of solvent is required as is the case with the above-mentioned solvents completely mixable with water.

According to the invention, the wet material is treated with a solvent which is sufficiently soluble in water to denaturate the albumen as a saturated solution in water whilst the solvent saturated with water dissolves the lipoid.

As examples of solvents suitable for carrying out the invention may be mentioned: methylethylketone, isobutanol, butanol-2, n-butanol, n-pentanol-2.

The invention is particularly suitable for extracting lipoids from animal material for the production of preparations of sensitive substances such as provitamin D and vitamin A. The invention is of especial importance for the production of vitamin A concentrates from animal material, more particularly from livers comparatively poor in fat, for, in comparison with the hitherto usual methods of extracting vitamin A from livers poor in fat, the possibility of losses is restricted to the utmost in a method wherein the material need not be saponified or heated and/or dried.

For producing temperature-sensitive substances the present method may be carried out at room temperature. If it is desired to obtain products in the preparation of which an increase of temperature can have no harmful influence at all, the rapidity of the extraction may be further enhanced by heating.

Example I 100 grs. of raw cow liver were ground with the aid of a hammermill; the pulp was shaken with 150 cubic centimetres of isobutanol saturated with water and after precipitation the layer of isobutanol was decanted from the watery mass of flesh. This treatment was repeated (5 times) until the layer decanted was colourless. The extract was evaporated in vacuo and the residue was dissolved in petroleum ether of low boiling-point, washed with water in order to remove the last traces of isobutanol, dried with the aid of $Na_2SO_4$ and freed from the solvent in vacuo. 4.067 grs. of vitamin A concentrate were obtained whilst in a test extraction with the aid of alcohol and petroleum ether 4.394 grs. were obtained.

Example II

Raw mussels were scaled and the flesh was ground in a hammermill. For testing purposes a small quantity thereof was at first extracted twice with the aid of 96% alcohol and then both the flesh and the alcohol were extracted 4 times in all with the aid of di-isopropylether, 7.80% of lipoid extract being found (calculated with respect to flesh free from water). This fat was found to contain 8.67% of sterols, i. e., about 0.68% with respect to dry flesh.

500 grs. of the same mussel pulp were shaken 3 times each time for 15 minutes and each time with 500 cubic centimetres of butanol-2 saturated with water. The solvent was removed in vacuo from the collected extracts and a residue was obtained which constituted 8.91% of the flesh free from water. Upon saponification this lipoid extract was found to contain 7.62% of sterols, i. e. about 0.68% with respect to dry flesh.

Another quantity of raw flesh of scaled and ground mussels, which, in a test such as has been mentioned hereinbefore, was found to contain 10.58% of lipoids and 0.79% of sterols with respect to flesh free from water, was treated in the above-described manner with methyl-ethylketone. After removal of the solvent in vacuo there were obtained a lipoid extract of 10.29% and a sterol fraction of 0.804%, calculated with respect to flesh free from water.

What I claim is:

1. The method of preparing vitamin A concentrate from livers poor in fat, comprising the steps of grinding the liver into a pulpy mass, mixing said pulpy mass with isobutanol, separating the layer of liquid thus formed, successively repeating the steps of mixing the pulpy mass and separating the liquid until a colorless liquid is obtained, heating the liquid in vacuo to obtain a residue, dissolving said residue in a low boiling point petroleum ether, washing the residue with water to remove the traces of isobutanol, drying the residue with sodium sulfate, and expelling the solvent in vacuo to obtain the vitamin A concentrate.

2. The method of preparing a vitiman A concentrate from cow livers poor in fat, comprising the steps of subjecting the animal material to the action of a partially water miscible organic solvent selected from the group consisting of methyl-ethylketone, isobutanol, butanol-2, n-butanol, and n-pentanol-2 saturated with water to denaturate the albumens while dissolving the lipoids to produce an extract of the material containing vitamin A, and expelling the solvent to recover the vitamin A concentrate.

3. The process of preparing a vitamin A concentrate from cow livers comprising the steps of subjecting the cow livers to the action of isobutanol saturated with water to denaturate the albumens while dissolving the lipoids to obtain an extract containing vitamin A, drying the extract to form a residue, dissolving the residue in petroleum ether, and thereafter expelling the ether to recover the vitamin A concentrate.

WILLEM STEVENS.

REFERENCES CITED

The following references are of record in the file of this patent:

UNITED STATES PATENTS

| Number | Name | Date |
| --- | --- | --- |
| 1,978,298 | Eldred | Oct. 23, 1934 |
| 2,027,446 | Meyer | Jan. 14, 1936 |
| 2,067,279 | Nitardy et al. | Jan. 12, 1937 |
| 2,131,394 | Test | Sept. 27, 1938 |
| 2,202,029 | Sevag | May 28, 1940 |
| 2,216,719 | Boer | Oct. 8, 1940 |
| 2,371,467 | Porsche | Mar. 13, 1945 |
| 2,404,365 | Dryden et al. | July 23, 1946 |

FOREIGN PATENTS

| Number | Country | Date |
| --- | --- | --- |
| 670,396 | Germany | Jan. 18, 1939 |